United States Patent
Miyamae

(10) Patent No.: US 9,753,803 B2
(45) Date of Patent: Sep. 5, 2017

(54) STORAGE SYSTEM AND INFORMATION PROCESSING APPARATUS

(71) Applicant: FUJITSU LIMITED, Kawasaki-shi, Kanagawa (JP)

(72) Inventor: Takeshi Miyamae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 470 days.

(21) Appl. No.: 14/179,984

(22) Filed: Feb. 13, 2014

(65) Prior Publication Data

US 2014/0297973 A1    Oct. 2, 2014

(30) Foreign Application Priority Data

Mar. 28, 2013  (JP) ................. 2013-069341

(51) Int. Cl.
G06F 12/00 (2006.01)
G06F 11/10 (2006.01)
G06F 3/06 (2006.01)

(52) U.S. Cl.
CPC ........ *G06F 11/1076* (2013.01); *G06F 3/0605* (2013.01); *G06F 2211/1028* (2013.01)

(58) Field of Classification Search
CPC ..................... G06F 11/1076; G06F 3/0689
See application file for complete search history.

(56) References Cited

U.S. PATENT DOCUMENTS

| | | | |
|---|---|---|---|
| 6,223,300 B1 | 4/2001 | Gotoh | |
| 6,571,314 B1 | 5/2003 | Komachiya et al. | |
| 7,305,529 B1* | 12/2007 | Kekre | G06F 11/2058 707/999.008 |
| 7,313,724 B1* | 12/2007 | Kekre | G06F 11/2082 714/12 |
| 2005/0138284 A1* | 6/2005 | Cohn | G06F 11/1076 711/114 |

(Continued)

FOREIGN PATENT DOCUMENTS

| | | |
|---|---|---|
| JP | 11-154057 | 6/1999 |
| JP | 2004-94429 | 3/2004 |
| WO | 98/12621 A1 | 3/1998 |

OTHER PUBLICATIONS

Japanese Office Action mailed Nov. 22, 2016 for corresponding Japanese Patent Application No. 2013-069341, with Partial English Translation, 5 pages.

*Primary Examiner* — Ryan Bertram
*Assistant Examiner* — Trang Ta
(74) *Attorney, Agent, or Firm* — Fujitsu Patent Center

(57) ABSTRACT

A storage system includes an information processing apparatus and plural storage nodes. A replication unit replicates plural data elements respectively stored in plural data regions of one of the plural storage nodes, and stores replicated data elements respectively in plural data regions of each of the other storage nodes. A parity generation unit generates a parity corresponding to the data elements respectively stored in the plural data regions, and stores the parity in the parity region, for each of the storage nodes. The data selection unit selects one or more data regions that hold data elements, from among the plural data regions, and releases one or more non-selected data regions, for each of the storage nodes, so as to reduce a multiplicity of the data elements respectively stored in the plural data regions of each of the plural storage nodes.

9 Claims, 19 Drawing Sheets

(56) References Cited

U.S. PATENT DOCUMENTS

2008/0001791 A1* 1/2008 Wanigasekara-Mohotti .............
 H04N 21/2182
 341/50
2014/0189268 A1* 7/2014 Baldwin ............... G06F 3/0608
 711/160
2014/0201439 A1* 7/2014 Sasaki ................. G06F 11/1092
 711/114
2014/0351632 A1* 11/2014 Grube ................. G06F 11/1092
 714/6.24

* cited by examiner

STORAGE SYSTEM AND INFORMATION PROCESSING APPARATUS

CROSS-REFERENCE TO RELATED APPLICATION

This application is based upon and claims the benefit of priority of the prior Japanese Patent Application No. 2013-069341, filed on Mar. 28, 2013, the entire contents of which are incorporated herein by reference.

FIELD

The embodiments discussed herein are related to a storage system and an information processing apparatus.

BACKGROUND

In storage systems such as distributed storage systems and so on, the access frequency to newly generated data is high. Such a storage system therefore performs replication, which ensures availability and reliability of data by replicating data and arranging replicated data in a plurality of storage nodes in a distributed manner.

However, replication has high storage overhead (low capacity efficiency). Therefore, when the access frequency becomes not so high, the storage system shifts from replication to redundant arrays of independent disks (RAID), which has low storage overhead.

A shift from replication to RAID involves not only reading data for parity calculation, but also transferring data between nodes, and hence might affect user operations. Further, in the course of shifting from replication to RAID, replication and RAID temporarily overlap. This increases the consumption of storage resources.

As a technique addressing these issues, there is known a disk array apparatus that is capable of changing the RAID level without transferring data between storage nodes according to a condition (see, for example, Japanese Laid-open Patent Publication No. 2004-94429).

However, a shift from replication to RAID still involves data transfer between storage nodes, and there is room to reduce the effects on user operations.

SUMMARY

According to one aspect of the invention, there is provided a storage system that includes an information processing apparatus and a plurality of storage nodes. In this storage system, each of the storage nodes includes a plurality of data regions and a parity region corresponding to the plurality of data regions. Further, the information processing apparatus includes one or more processors configured to perform a procedure including: replicating a plurality of data elements respectively stored in the plurality of data regions of one of the plurality of storage nodes, and storing replicated data elements respectively in the plurality of data regions of each of the other storage nodes; generating a parity corresponding to the data elements respectively stored in the plurality of data regions, and storing the parity in the parity region, for each of the storage nodes; and selecting one or more data regions that hold data elements, from among the plurality of data regions, and releasing one or more non-selected data regions, for each of the storage nodes, so as to reduce a multiplicity of the data elements respectively stored in the plurality of data regions of each of the plurality of storage nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
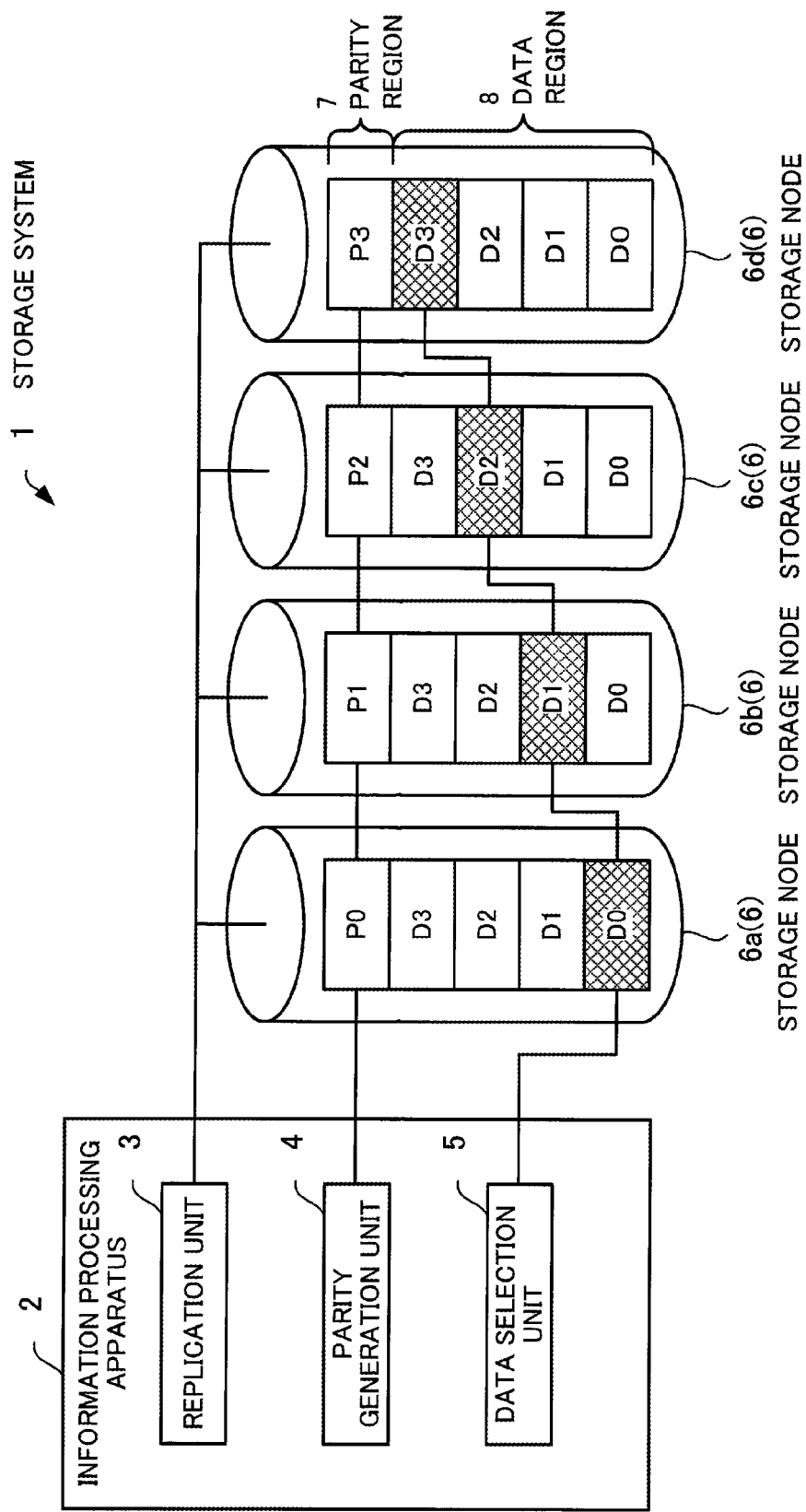
FIG. 1 illustrates an example of the configuration of a storage system according to a first embodiment.

Several embodiments will be described below with reference to the accompanying drawings, wherein like reference numerals refer to like elements throughout.

(a) First Embodiment

First, a storage system 1 of a first embodiment will be described with reference to FIG. 1. FIG. 1 illustrates an example of the configuration of the storage system 1 according to the first embodiment.

The storage system 1 is a distributed storage system, and ensures availability and reliability by implementing replication and RAID. When data is newly generated, the storage system 1 replicates the data. However, since replication has high storage overhead, the storage system 1 performs a shift to RAID at an appropriate timing.

The storage system 1 includes an information processing apparatus 2 and a plurality of storage nodes 6 (6a, 6b, 6c, and 6d). Each storage node 6 includes data regions 8 and a parity region 7. The storage node 6 holds data elements in the plurality of data regions 8, and holds in the parity region 7 a parity corresponding to the plurality of data regions 8.

The information processing apparatus 2 is a management node that manages the storage nodes 6. The information processing apparatus 2 may include the plurality of storage nodes 6, or may be externally connected to the plurality of storage nodes 6 through a network (not illustrated). Further, a plurality of information processing apparatuses 2 may be provided, one for each of the storage nodes 6. In this case, one of the information processing apparatuses 2 may serve as a master while the other information processing apparatuses 2 may serve as slaves, so as to manage the plurality of storage nodes 6. Alternatively, the plurality of information processing apparatuses 2 may together manage the plurality of storage nodes 6.

The information processing apparatus 2 includes a replication unit 3, a parity generation unit 4, and a data selection unit 5. The replication unit 3 replicates data in the storage system 1. The replication unit 3 replicates each of a plurality of data elements D0, D1, D2, and D3 stored in the plurality of data regions 8 of one of the storage nodes 6a, 6b, 6c, and 6d (for example, the storage node 6a). The replication unit 3 stores the replicated data elements D0, D1, D2, and D3 respectively in the plurality of data regions 8 of each of the other storage nodes 6 (for example, the storage nodes 6b, 6c, and 6d). In other words, the replication unit 3 causes the data regions 8 of each of the storage nodes 6a, 6b, 6c, and 6d to hold the data elements D0, D1, D2, and D3. Thus, the storage system 1 realizes four replications for each of the data elements D0, D1, D2, and D3.

The parity generation unit 4 generates a parity corresponding to data elements respectively stored in the data regions 8, for each storage node 6. For example, the parity generation unit 4 generates a parity P0 corresponding to the data elements D0, D1, D2, D3 held in the data regions 8, for the storage node 6a. The parity generation unit 4 stores (holds) the parity P0 in the parity region 7. In the same manner, the parity generation unit 4 generates parities P1, P2, and P3 for the storage nodes 6b, 6c, and 6d, respectively, and stores the parities P1, P2, and P3 in the respective parity regions 7. Note that the parities P0, P1, P2, and P3 may be the same parity, or may be different parities corresponding to the data elements D0, D1, D2, and D3, respectively.

The data selection unit 5 selects a data region 8 that holds a data element, from among the plurality of data regions 8, and releases the other data regions 8 (the data regions 8 that are not selected), for each storage node 6. This "release" operation is for excluding a data element held in the data region 8 from the subjects of replication, and includes clearing the data element held in the data region 8. In this case, the data selection unit 5 performs selection and release so as to reduce the multiplicity of the data elements respectively stored in the plurality of data regions 8 of each of the plurality of storage nodes 6.

For example, the data selection unit 5 selects, for the storage node 6a, the data region 8 holding the data element D0, and releases the data regions 8 holding the data elements D1, D2, and D3. In the same manner, the data selection unit 5 selects, for the storage nodes 6b, 6c, and 6d, the data regions 8 holding the data elements D1, D2, and D3, respectively. The dada elements retained in the data regions 8 by the storage nodes 6 are indicated by hutching.

In this way, the storage system 1 is able to generate the parities, reduce the multiplicity of replication (for example, from multiplicity 4 to multiplicity 1), and thus perform a shift to RAID, without transferring data between storage nodes. In performing a shift from replication to RAID, the storage system 1 does not perform data transfer between storage nodes. This makes it possible to reduce the effects on user operations.

Note that the storage system 1 may reduce the multiplicity of replication in a stepwise manner. For example, the storage system 1 reduces the multiplicity of replication from 4 to 2 at a certain timing, and reduces the multiplicity of replication from 2 to 1 at the next timing. In this case, the storage system 1 is able to provide the user with replication and RAID according to the course in which the access frequency to the newly generated data gradually decreases from a high level to a low level.

(b) Second Embodiment

Figure 2:
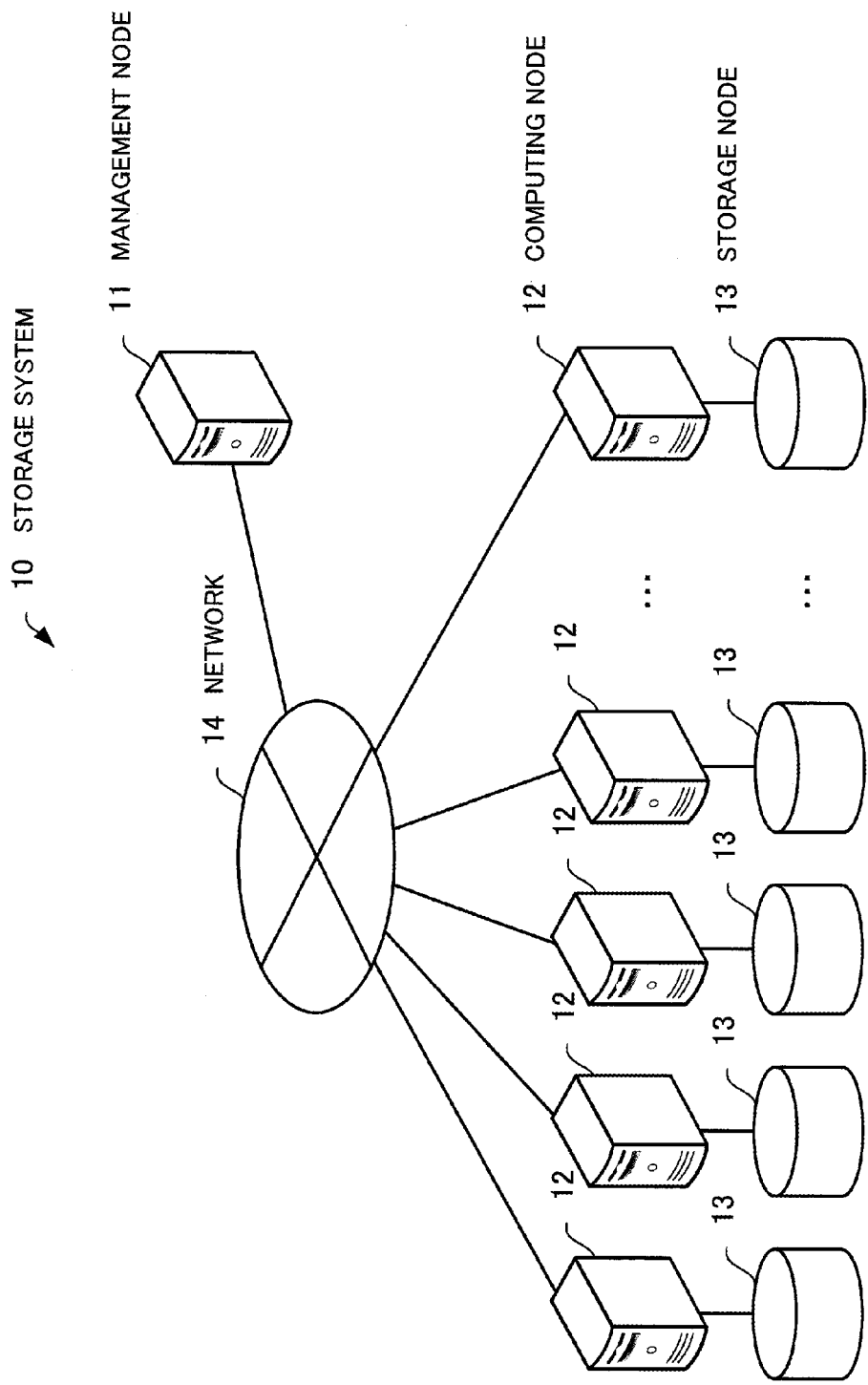
FIG. 2 illustrates an example of the configuration of a storage system according to a second embodiment.

Next, the configuration of a storage system 10 of a second embodiment will be described with reference to FIG. 2. FIG. 2 illustrates an example of the configuration of the storage system 10 according to the second embodiment.

The storage system 10 is a distributed storage system including a plurality of storage nodes 13 that connect to a network 14 through a plurality of computing nodes 12, respectively. The storage system 10 is a distributed storage system, and ensures availability and reliability by implementing replication and RAID using the plurality of storage nodes 13.

Each storage node 13 includes one or more storage devices (for example, hard disk drive (HDD), solid state drive (SSD) (flash memory drive), and the like), and is capable of holding data.

Each computing node 12 is connected to the corresponding storage node 13. The computing node 12 receives an input or output request indicating a logical address, and accesses a physical address of the storage node 13 corresponding to the logical address. The storage system 10 implements replication and RAID across the plurality of computing nodes 12.

The storage system 10 may implement replication and RAID in a manner such that one of the computing nodes 12 serves as a master while the other computing nodes 12 serve as slaves so as to manage the plurality of storage nodes 13. Alternatively, the storage system 10 may implement replication and RAID in a manner such that the plurality of computing nodes 12 together manage the plurality of storage nodes 13.

Further, the storage system 10 includes a management node 11 that is communicable with the computing nodes 12 through the network 14. Alternatively, the storage system 10 may implement replication and RAID in a manner such that the management node 11 manages the plurality of storage nodes 13 through the computing nodes 12.

Figure 3:
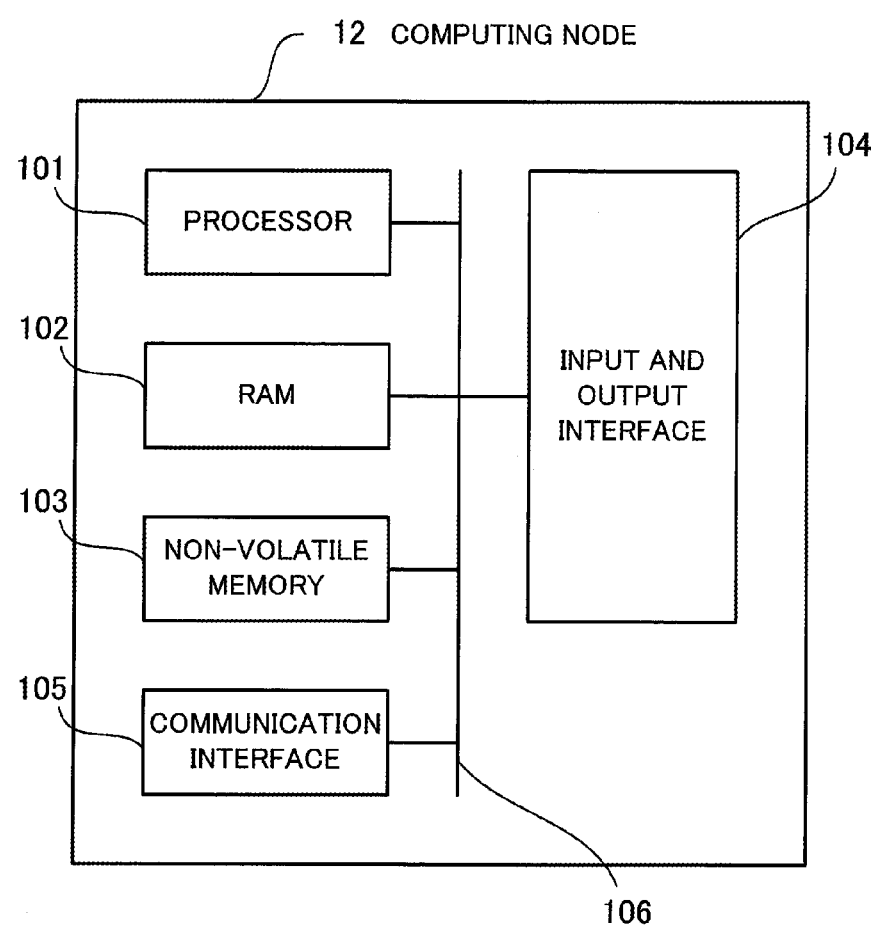
FIG. 3 illustrates an example of the hardware configuration of a computing node according to the second embodiment.

Next, the hardware configuration of the computing node 12 of the second embodiment will be described with reference to FIG. 3. FIG. 3 illustrates an example of the hardware configuration of the computing node 12 according to the second embodiment.

The entire operation of the computing node 12 is controlled by a processor 101. A random access memory (RAM) 102 and a plurality of peripheral devices are connected to the processor 101 via a bus 106. The processor 101 may be a multiprocessor. Examples of the processor 101 include central processing unit (CPU), micro processing unit (MPU), digital signal processor (DSP), application specific integrated circuit (ASIC), programmable logic device (PLD), and so on. Alternatively, the processor 101 may be a combination of two or more of the devices selected from CPU, MPU, DSP, ASIC, and PLD.

The RAM 102 serves as a primary storage device of the computing node 12. The RAM 102 temporarily stores at least part of the operating system (OS) program, firmware, and application programs that are executed by the processor 101. The RAM 102 also stores various types of data (for example, information management of system control) used for processing performed by the processor 101. The RAM 102 may be one that includes a cache memory, separately from a memory for storing various types of data.

Examples of peripheral devices connected to the bus 106 include a non-volatile memory 103, an input and output interface 104, and a communication interface 105.

The non-volatile memory 103 retains stored data even when power supply to the computing node 12 is disconnected. Examples of the non-volatile memory 103 include semiconductor memory device (such as electrically erasable programmable read-only memory (EEPROM), flash memory, and the like), HDD, and so on. The non-volatile memory 103 serves as a secondary storage device of the computing node 12. The non-volatile memory 103 stores the OS program, firmware, application programs, and various types of data.

The input and output interface 104 is connected to an input and output device, such as the storage node and so on, so as to perform input and output operations.

The communication interface 105 connects to the network 14 so as to exchange data with the other computing nodes 12 and the management node 11 through the network 14.

With the hardware configuration described above, it is possible to realize the processing functions of the computing node 12 of the second embodiment. Other than the computing node 12, it is possible to realize the management node 11 and the information processing apparatus 2 of the first embodiment, with a hardware configuration similar to that of the computing node 12 of FIG. 3.

The computing node 12 and the management node realize the processing functions of the second embodiment by executing a program stored in a computer-readable recording medium, for example. The program describing the procedure to be performed by the computing node 12 and the management node 11 may be stored in various recording media. For example, the program to be executed by the computing node 12 and the management node may be stored in the non-volatile memory 103. The processor 101 loads at least part of the program from the non-volatile memory 103 into the RAM 102 so as to execute the program. The program to be executed by the computing node 12 and the management node 11 may also be stored in a portable recording medium, such as optical disc, memory device, memory card, and so on (not illustrated). Examples of optical discs include digital versatile disc (DVD), DVD-RAM, compact disc read only memory (CD-ROM), CD-Recordable (CD-R), CD-Rewritable (CD-RW), and so on. The memory device is a recording medium having a function to communicate with the input and output interface 104 or a device connection interface (not illustrated). For example, the memory device is capable of writing data to and reading data from a memory card, with use of a memory reader and writer. The memory card is a card-type recording medium.

The program stored in the portable recording medium may be executed after being installed into the non-volatile memory 103 under the control of, for example, the processor 101. Further, the processor 101 may execute the program by reading the program directly from the portable recording medium.

Figure 4:
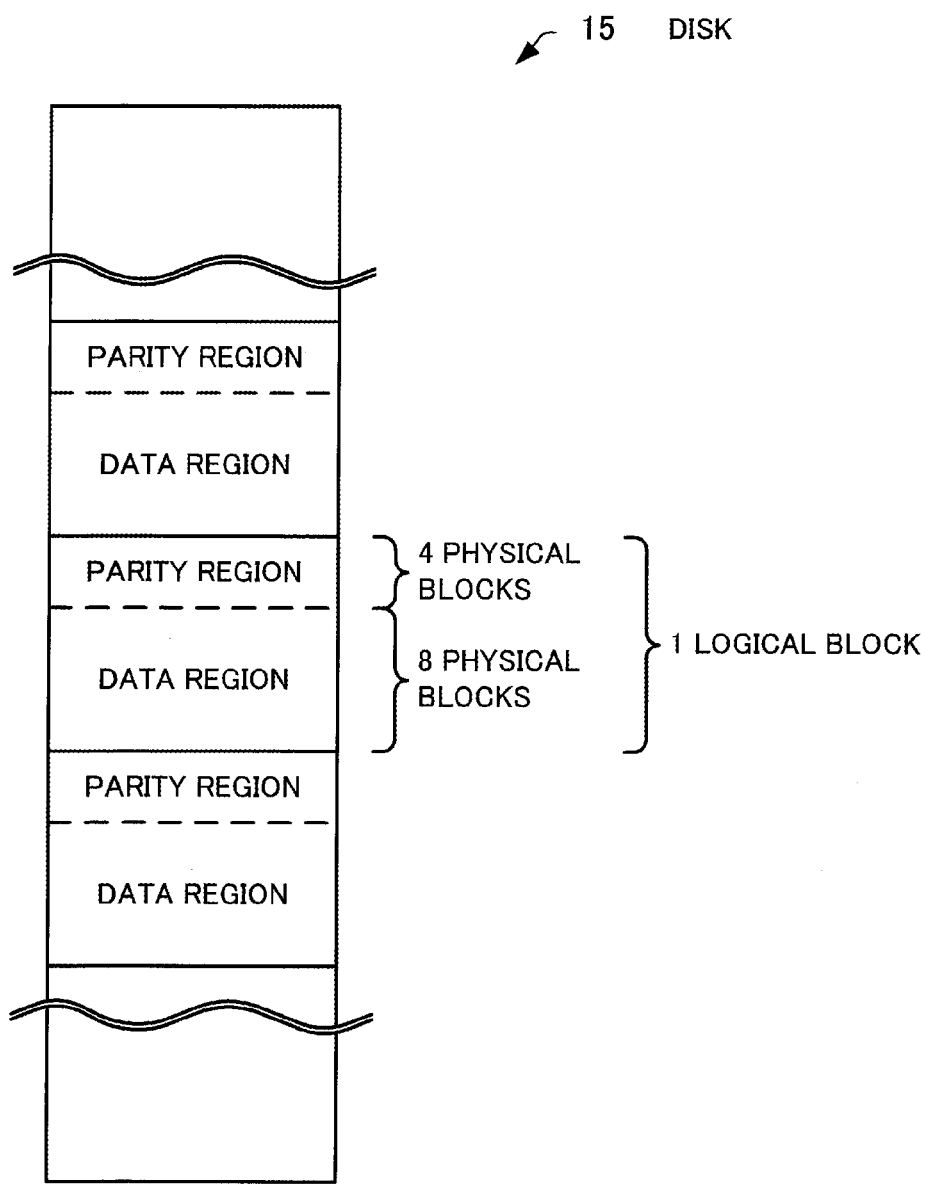
FIG. 4 illustrates an example of the configuration of a logical block in a disk according to the second embodiment.

Next, the configuration of a logical block of the storage of the second embodiment will be described with reference to FIG. 4. FIG. 4 illustrates an example of the configuration of a logical block in a disk 15 according to the second embodiment.

The disk 15 is one of the storage devices of the storage node 13. Examples of the disk 15 include HDD and SSD. In the disk 15, a plurality of logical blocks form a memory area (data storage area). Each logical block (single logical block) includes a data region and a corresponding parity region.

For example, in the case where the storage system 10 shifts from replication at multiplicity 8 to a RAID configuration of 8 fragments, each logical block has 12 physical blocks. In this case, a data region includes physical blocks, and a parity region includes 4 physical blocks. Each physical block is a storage area having a predetermined size. For example, the predetermined size may be a 512-byte size.

Figure 5:
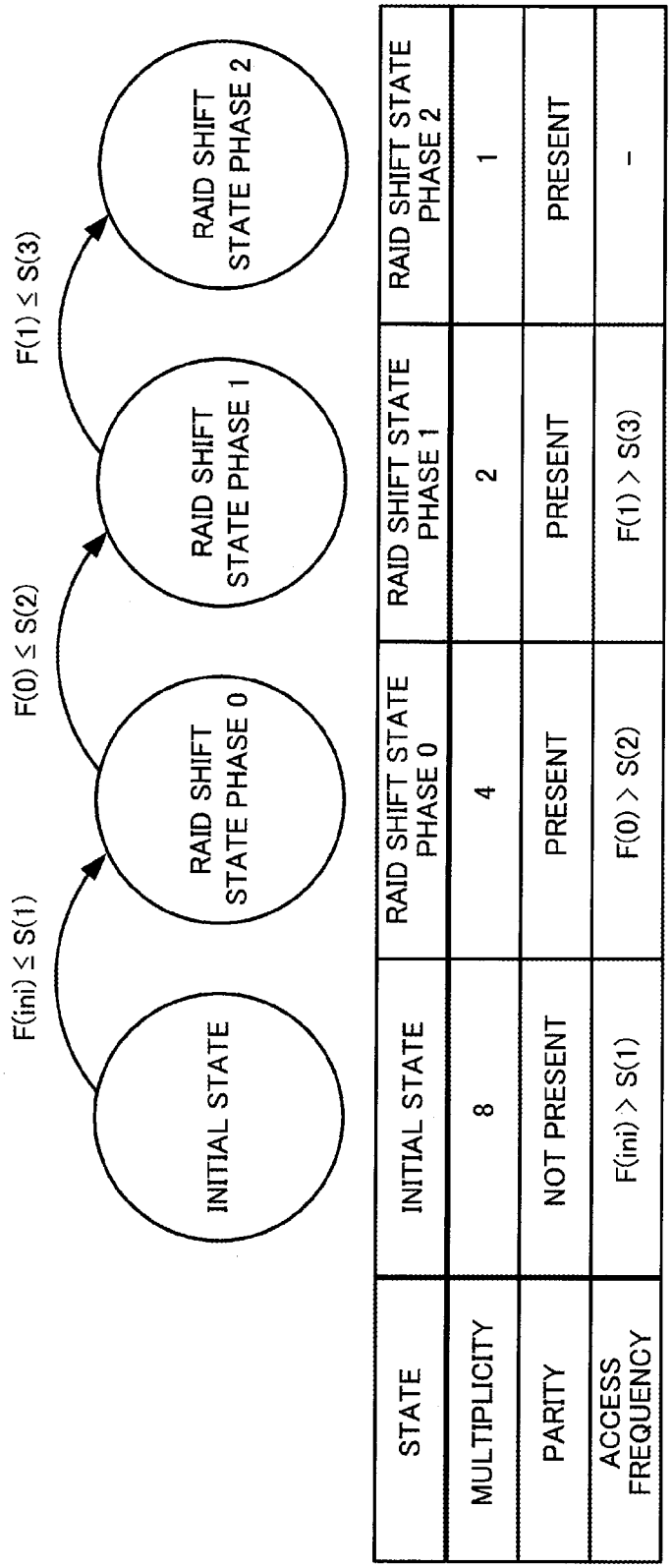
FIG. 5 illustrates an example in which the storage system shifts from replication at multiplicity 8 to a RAID configuration of 8 fragments according to the second embodiment.

Next, the process of shifting from replication to a RAID configuration according to the second embodiment will be described with reference to FIG. 5. FIG. 5 illustrates an example in which the storage system shifts from replication at multiplicity 8 to a RAID configuration of 8 fragments according to the second embodiment.

The storage system 10 performs a shift from replication to a RAID configuration in units of a predetermined number of logical blocks (for example, 1 logical block). In the process of shifting from replication to a RAID configuration, the initial state corresponding to replication at multiplicity 8 is changed to RAID shift state phase 0, then to RAID shift state phase 1, and then to RAID shift state phase 2 corresponding to a RAID configuration of 8 fragments.

In the initial state, the multiplicity of replication is 8, and parity is not yet held in the parity region. An access frequency F(ini) in the initial state is greater than a predetermined threshold S(1). The initial state is changed to RAID shift state phase 0 when the access frequency F(ini) drops to the threshold S(1) or below to satisfy a state transition condition (F(ini)≤S(1)).

In RAID shift state phase 0, the multiplicity of replication is 4, and parity is held in the parity region. An access frequency F(0) in the RAID shift state phase 0 is greater than a predetermined threshold S(2). The RAID shift state phase 0 is changed to RAID shift state phase 1 when the access frequency F(0) drops to the threshold S(2) or below to satisfy a state transition condition (F(0)≤S(2)).

In RAID shift state phase 1, the multiplicity of replication is 2, and parity is held in the parity region. An access frequency F(1) in RAID shift state phase 1 is greater than a predetermined threshold S(3). RAID shift state phase 1 is changed to RAID shift state phase 2 when the access frequency F(1) drops to the threshold S(3) or below to satisfy a state transition condition (F(1)≤S(3)).

In RAID shift state phase 2, the multiplicity of replication is 1, and parity is held in the parity region. That is, in RAID shift state phase 2, the shift from replication to a RAID configuration of 8 fragments has been completed. The access frequency in RAID shift state phase 2 may be any frequency, and is not monitored. RAID shift state phase 2 is the final transition state.

In this way, the storage system 10 shifts to RAID while reducing the multiplicity of replication in a stepwise manner. Therefore, it is possible to improve both the availability and capacity efficiency. Further, the storage system 10 has a parity region corresponding to a data region in each logical block, and hence does not need to transfer data between disks. This makes it possible to reduce the effects on user operations.

The access frequency may be an average access frequency in a predetermined period, the highest access frequency, or the like. The state transition may be performed immediately after the transition condition is satisfied, or may be performed at a predetermined shift timing (for example, maintenance time) after the transition condition is satisfied. Further, a determination whether the transition condition is satisfied may be made at predetermined time intervals, or may be made at a predetermined determination timing (for example, maintenance time or the like).

Figure 6:
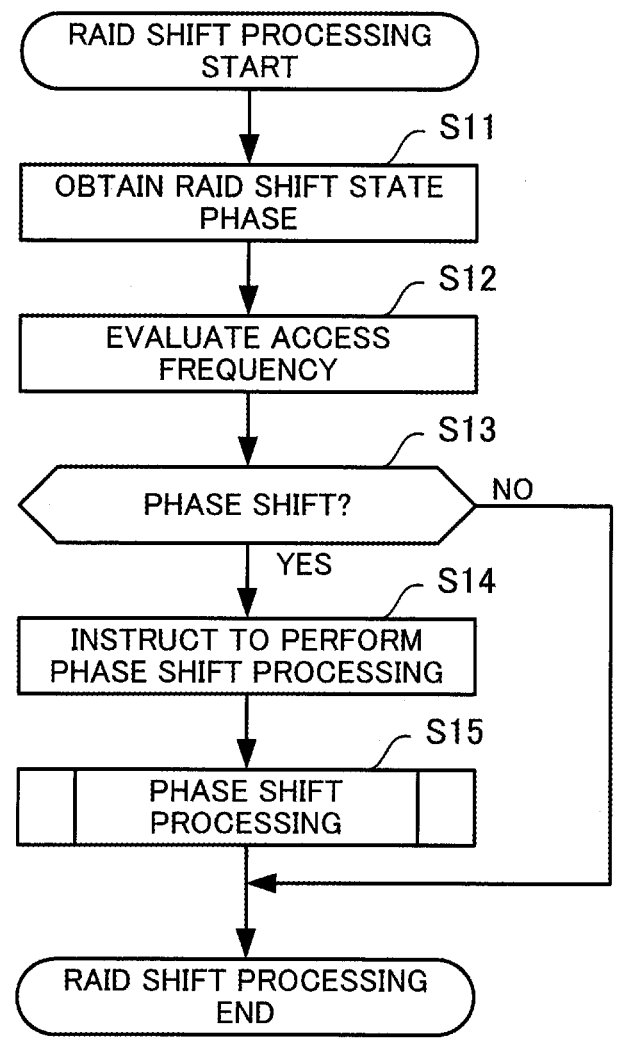
FIG. 6 is a flowchart illustrating RAID shift processing according to the second embodiment.

Next, RAID shift processing of the second embodiment will be described with reference to FIG. 6. FIG. 6 is a flowchart illustrating RAID shift processing according to the second embodiment.

The RAID shift processing is processing for shifting to RAID by reducing the multiplicity of replication in a stepwise manner. Among the computing nodes 12 connected to the storage nodes 13 implementing replication, the computing node 12 serving as a master performs RAID shift processing. The computing node 12 serving as a master performs RAID shift processing regularly, or irregularly at a predetermined timing. The computing node 12 serving as a master performs RAID shift processing on a logical block implementing replication when the logical block is in the initial state, the RAID shift state phase 0, or RAID shift state phase 1. Note that the RAID shift processing by the computing node 12 serving as a master is not performed on a logical block in RAID shift state phase 2 which has been shifted from replication to a RAID configuration.

(Step S11) The computing node 12 (processor 101) obtains the RAID shift state phase (initial state, RAID shift state phase 0, or RAID shift state phase 1) of a logical block implementing replication.

(Step S12) The computing node 12 evaluates the access frequency to the logical block implementing replication.

(Step S13) The computing node 12 compares the RAID shift state phase of the logical block implementing replication and the evaluation of the access frequency, and determines whether the state transition condition of FIG. 5 is satisfied (whether to shift the phase). If the computing node 12 determines that the state transition condition is satisfied, the process proceeds to step S14. If the computing node 12 determines that the state transition condition is not satisfied, the RAID shift processing ends.

(Step S14) The computing node 12 instructs a computing node 12 serving as a slave node to perform phase shift processing. The phase shift processing is processing for reducing the multiplicity of replication in a stepwise manner. The phase shift processing will be described below with reference to FIG. 7.

(Step S15) The computing node 12 instructs a storage node 13 connected thereto to perform phase shift processing. Then, the RAID shift processing ends.

As is understood from the above, the computing node 12 has a function of a management unit that manages the progress of the RAID shift state phase, including functions as a monitoring unit for monitoring the condition for progress of the RAID shift state phase and a determination unit for determining the progress of the RAID shift state phase (determining whether a data region may be selected). Note that the condition for progress of the RAID shift state phase is not limited to the access frequency, and any condition may be set such as the time elapsed from generation of data, the data volume in the storage node, and the like.

Figure 7:
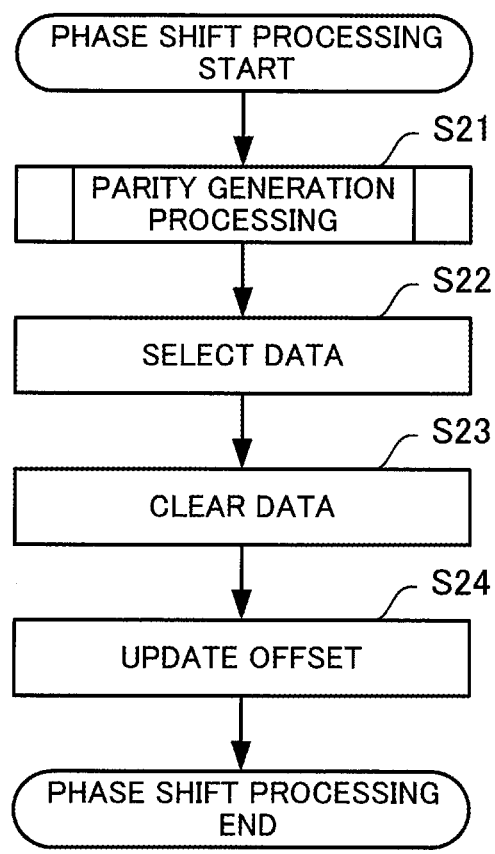
FIG. 7 is a flowchart illustrating phase shift processing according to the second embodiment.

Next, phase shift processing of the second embodiment will be described with reference to FIG. 7. FIG. 7 is a flowchart illustrating phase shift processing according to the second embodiment.

The phase shift processing is processing for reducing the multiplicity of replication in a stepwise manner. The computing nodes 12 connected to the storage nodes 13 implementing replication perform phase shift processing. Among the computing nodes 12 connected to the storage nodes 13 implementing replication, the computing node 12 serving as a master performs phase shift processing in RAID shift processing. Among the computing nodes 12 connected to the storage nodes 13 implementing replication, the computing nodes 12 serving as slave nodes perform phase shift processing in response to an execution instruction from the computing node 12 serving as a master.

(Step S21) The computing node 12 (processor 101) performs parity generation processing. The parity generation processing is processing for generating a parity corresponding to a data region. The parity generation processing will be described below with reference to FIG. 8.

(Step S22) In the case of reducing the multiplicity of replication, the computing node 12 selects a data element to be retained in the data region in the next RAID shift state phase.

(Step S23) The computing node 12 clears a data element that is not selected in step S22. This "clear" operation includes deleting data, and resetting the corresponding relationship between a physical block holding a data element and a logical block. In this way, the storage node 13 is able to improve the data capacity efficiency.

(Step S24) The computing node 12 updates the offset in response to clearing of the data element. Then, the phase shift processing ends. Note that the offset is information indicating a physical address to be accessed in response to an access to a logical address.

Figure 8:
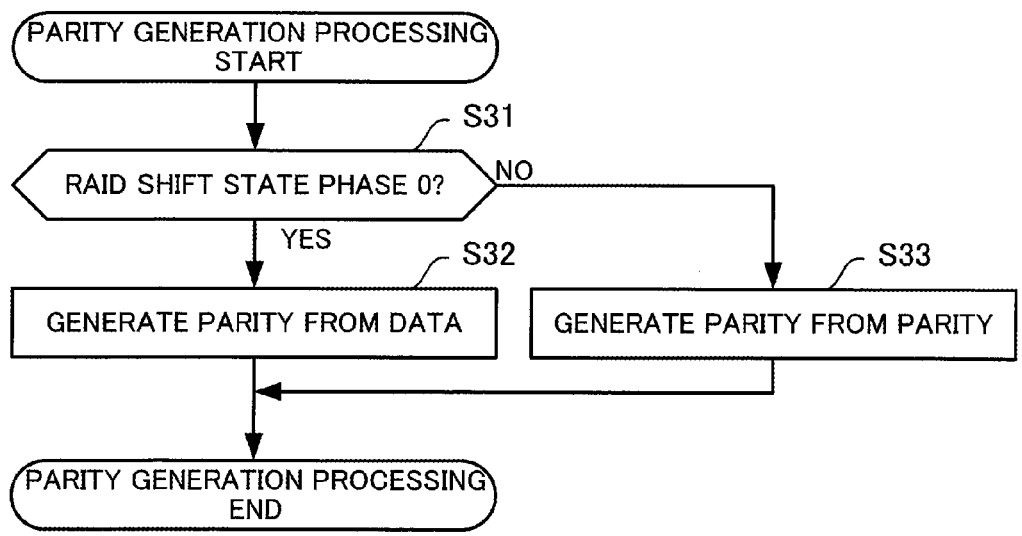
FIG. 8 is a flowchart illustrating parity generation processing according to the second embodiment.

Next, parity generation processing will be described with reference to FIG. 8. FIG. 8 is a flowchart illustrating parity generation processing according to the second embodiment.

The parity generation processing is processing for generating a parity corresponding to a data region. The computing node 12 connected to the storage node 13 implementing replication performs parity generation processing in step S21 of the phase shift processing.

(Step S31) The computing node 12 (processor 101) determines whether the RAID shift state phase of a logical block implementing replication is RAID shift state phase 0. If the RAID shift state phase is RAID shift state phase 0, the process proceeds to step S32. If the RAID shift state phase is not RAID shift state phase 0, the process proceeds to step S33.

(Step S32) The computing node 12 generates a parity on the basis of data elements held in the data region, and stores the parity in the parity region. Then, the parity generation processing ends.

(Step S33) The computing node 12 generates a new parity on the basis of a parity held in the parity region, and stores the new parity in the parity region. Then, the parity generation processing ends.

In this way, the computing node 12 is able to generate a new parity or an updated parity in response to a reduction in the multiplicity of replication, without exchanging data with the other computing nodes 12. Accordingly, the storage system 10 does not need to perform data transfer between the computing nodes 12. This makes it possible to reduce the effects on user operations.

Figure 9:
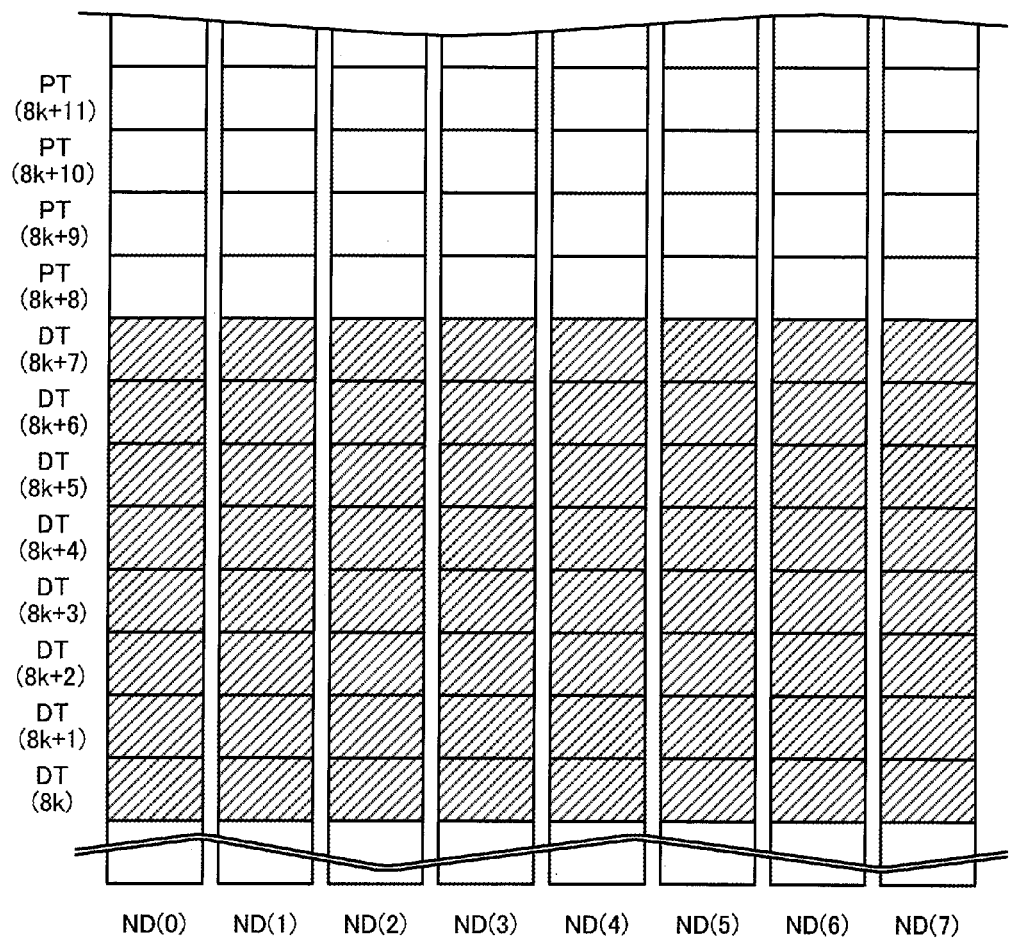
FIG. 9 illustrates an example of logical blocks (without parity) in replication at multiplicity 8 according to the second embodiment.

Next, logical blocks in the process of shifting from replication to a RAID configuration according to the second embodiment will be described with reference to FIGS. 9 through 13. FIG. 9 is an example of logical blocks (without parity) in replication at multiplicity 8 according to the second embodiment.

Reference numerals ND(0) through ND(7) denote storage nodes 13 that realize replication at multiplicity 8 for a predetermined number of logical blocks. For ease of explanation, it is assumed that storage nodes ND(0) through ND(7) realize replication at multiplicity 8 for one logical block. Note that the multiplicity of one logical block, that is, the multiplicity of data elements respectively stored in the plurality of data regions of each of the plurality of storage nodes 13, is preferably a power of 2. For example, the multiplicity may be 8, which is the cube of 2.

In this case, the storage system 10 includes a number of storage nodes 13 corresponding to the multiplicity of data upon replication. For example, the storage system 10 includes a power of 2 number of storage nodes 13. In the case of replication at multiplicity 8 (=the cube of 2), the storage system 10 includes 8 storage nodes 13.

The RAID shift state phase of the storage nodes ND(0) through ND(7) is the initial state. Each logical block has a total of 12 physical blocks, including 8 physical blocks DT(8$k$) through DT(8$k$+7) and 4 physical blocks PT(8$k$+8) through PT(8$k$+11).

Note that, the hatched physical blocks in FIG. 9 indicate that data elements are held. The storage nodes ND(0) through ND(7) have the same data elements in their respective 8 physical blocks DT(8$k$) through DT(8$k$+7). Parities are not yet stored in the parity regions.

When the access frequency decreases and hence the state transition condition is satisfied, the logical blocks in the initial state are shifted to RAID shift state phase 0. In response to the shift to RAID shift state phase 0, each of the storage nodes ND(0) through ND(7) generates, in the physical blocks PT(8K+8) through PT(8$k$+11), parities corresponding to the physical blocks DT(8$k$) through DT(8$k$+7).

Figure 10:
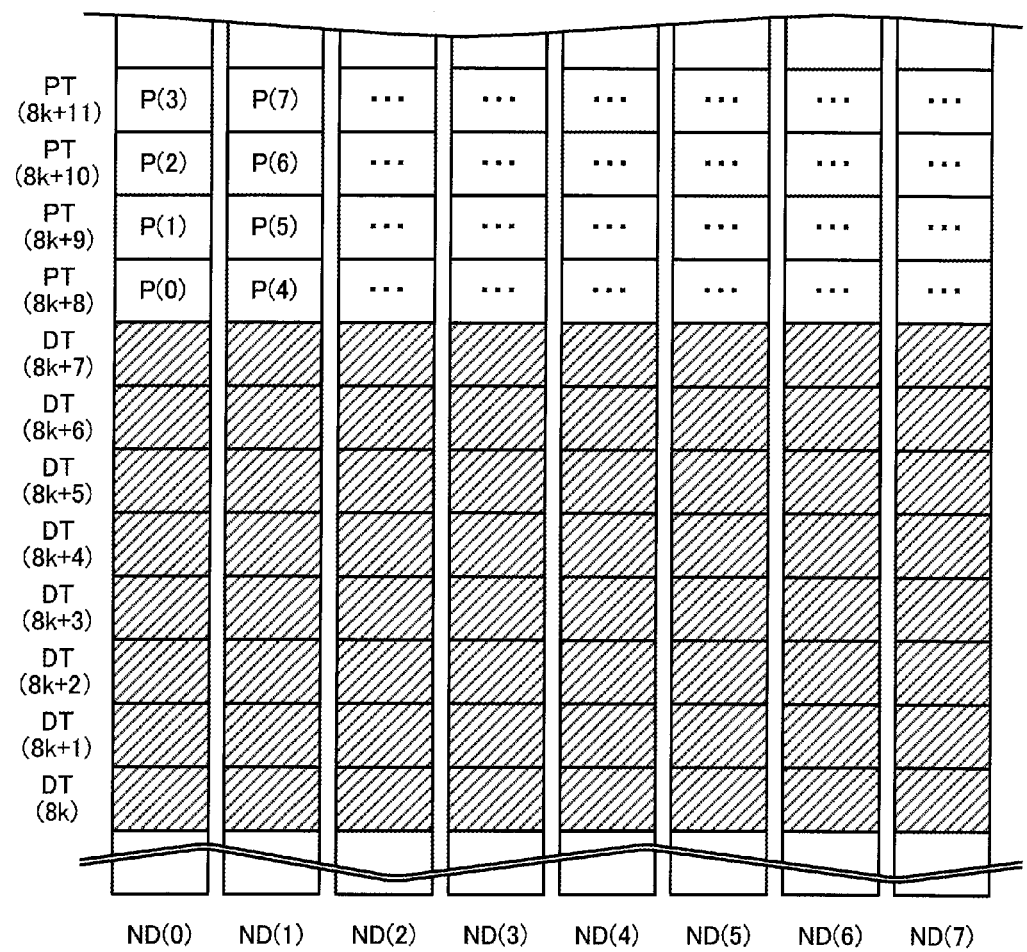
FIG. 10 illustrates an example of logical blocks (with parity) in replication at multiplicity 8 according to the second embodiment.

The storage nodes ND(0) through ND(7) in this step are depicted in FIG. 10. FIG. 10 illustrates an example of logical blocks (with parity) in replication at multiplicity 8 according to the second embodiment.

The storage system 10 generates initial parities in RAID shift state phase 0. Since the multiplicity is 8 (=the cube of 2, M=3), the storage system 10 generates parities corresponding to data elements for $2^{M-1}=2^2=4$ extents in the same storage node 13. For example, the storage system 10 generates and stores a parity P(0) in the physical block PT(8$k$+8) of the storage node ND(0), a parity P(1) in the physical block PT(8$k$+9), a parity P(2) in the physical block PT(8$k$+10), and a parity P(3) in the physical block PT(8$k$+11). The storage system 10 generates and stores a parity P(4) in the physical block PT(8$k$+8) of the storage node ND(1), a parity P(5) in the physical block PT(8$k$+9), a parity P(6) in the physical block PT(8$k$+10), and a parity P(7) in the physical block PT(8$k$+11). Note that parity may be calculated using any known calculation formula.

Allocation of parities may be generalized as described below. The following is a method of allocating parities in the case of shifting replication at multiplicity N ($=2^M$) to a RAID configuration of N fragments.

A parity for an extent at address A in RAID shift state phase 0 is allocated in a storage node ND (storage node 13) calculated using formula (1).

$$n(A)=A \text{ div } 2^{M-1} \text{ mod } 2^M \qquad (1)$$

Thus, parities for $2^{M-1}$ extents that satisfy formula (2) are allocated in a single storage node ND.

$$A=\alpha 2^{M-1}+k_0 \ (0 \leq k_0 < 2^{M-1}) \qquad (2)$$

in which α is a variable representing the location of the logical block.

In RAID shift state phase 0, after parities are generated, data regions that hold data elements are selected and data regions that are not selected are cleared in the storage nodes ND(0) through ND(7) in order to reduce the multiplicity of replication.

Figure 11:
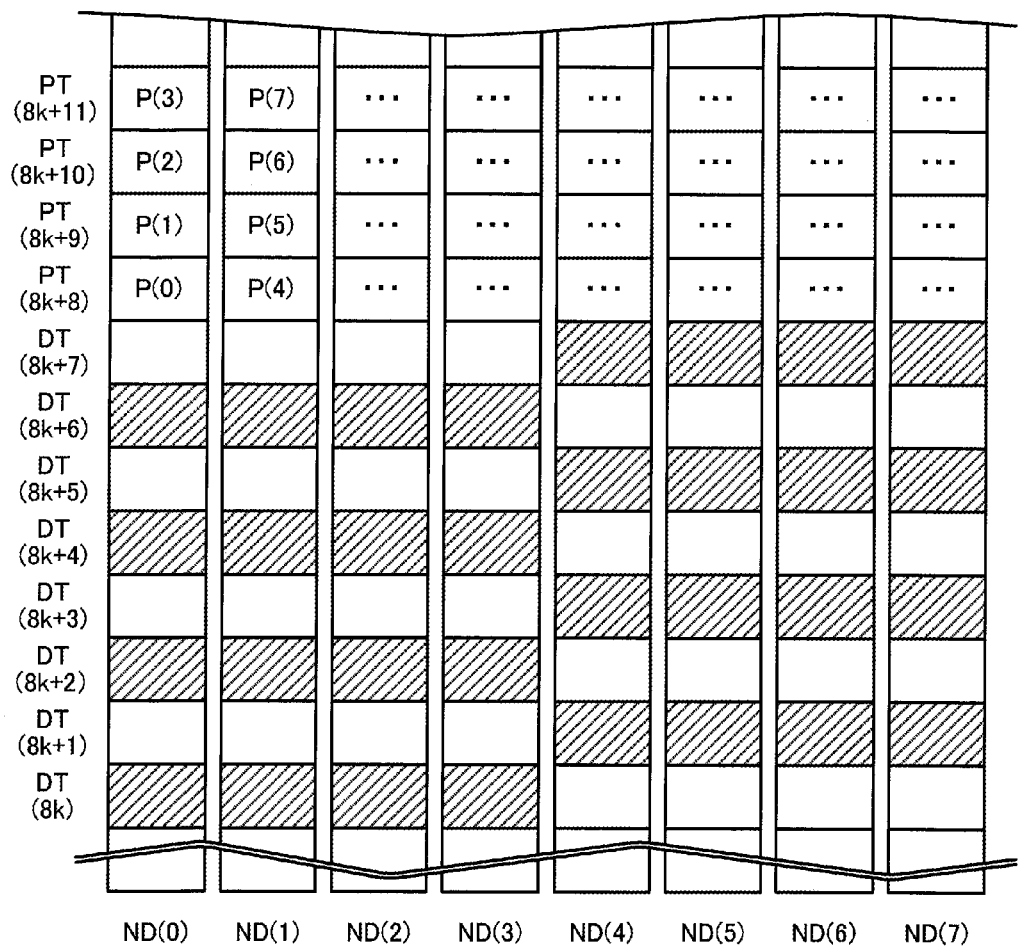
FIG. 11 illustrates an example of logical blocks (with parity) in replication at multiplicity 4 according to the second embodiment.

The storage nodes ND(0) through ND(7) in this step are depicted in FIG. 11. FIG. 11 illustrates an example of logical blocks (with parity) in replication at multiplicity 4 according to the second embodiment.

In RAID shift state phase 0, the storage system 10 selects data regions that hold data elements. The hatched physical blocks in FIG. 11 indicate the selected data regions. For example, data regions at even addresses are selected in the storage nodes ND(0) through ND(3), and data regions at odd addresses are selected in the storage nodes ND(4) through ND(7). Thus, the multiplicity of replication in the storage nodes ND(0) through ND(7) becomes 4.

Selection of data regions in the case of reducing the multiplicity may be generalized as described below. In the case of shifting replication at multiplicity N ($=2^M$) to a RAID configuration of N fragments, the computing node 12 selects data regions in accordance with formula (3) in RAID shift state phase ph (ph=0, 1, 2, . . . , M−1).

$$d_n(M-ph-1)=n \text{ div } 2^{M-ph-1} \text{ mod } 2 \qquad (3)$$

in which $d_n(i)$ is a value of the i-th (i=0, 1, 2, . . . , M−1) lowest bit (digit) in the binary representation of the node number n (identification information of the storage node 13: n=0, 1, 2, . . . , N−1).

If $d_n(M-ph-1)=0$, the computing node 12 selects data regions at even-numbered block addresses (for example, even addresses) from the top in the storage node ND(n), and clears data elements in the non-selected data regions. On the other hand, if $d_n(M-ph-1)=1$, the computing node 12 selects data regions at odd-numbered block addresses (for example, odd addresses) from the top in the storage node ND(n), and clears data elements in the non-selected data regions.

Note that, due to the selection of data regions and clearing of data elements in the non-selected data regions, it becomes impossible to read data elements from some of the data regions that have been accessible. Therefore, the computing node 12 updates the formula for calculating the offset.

Figure 12:
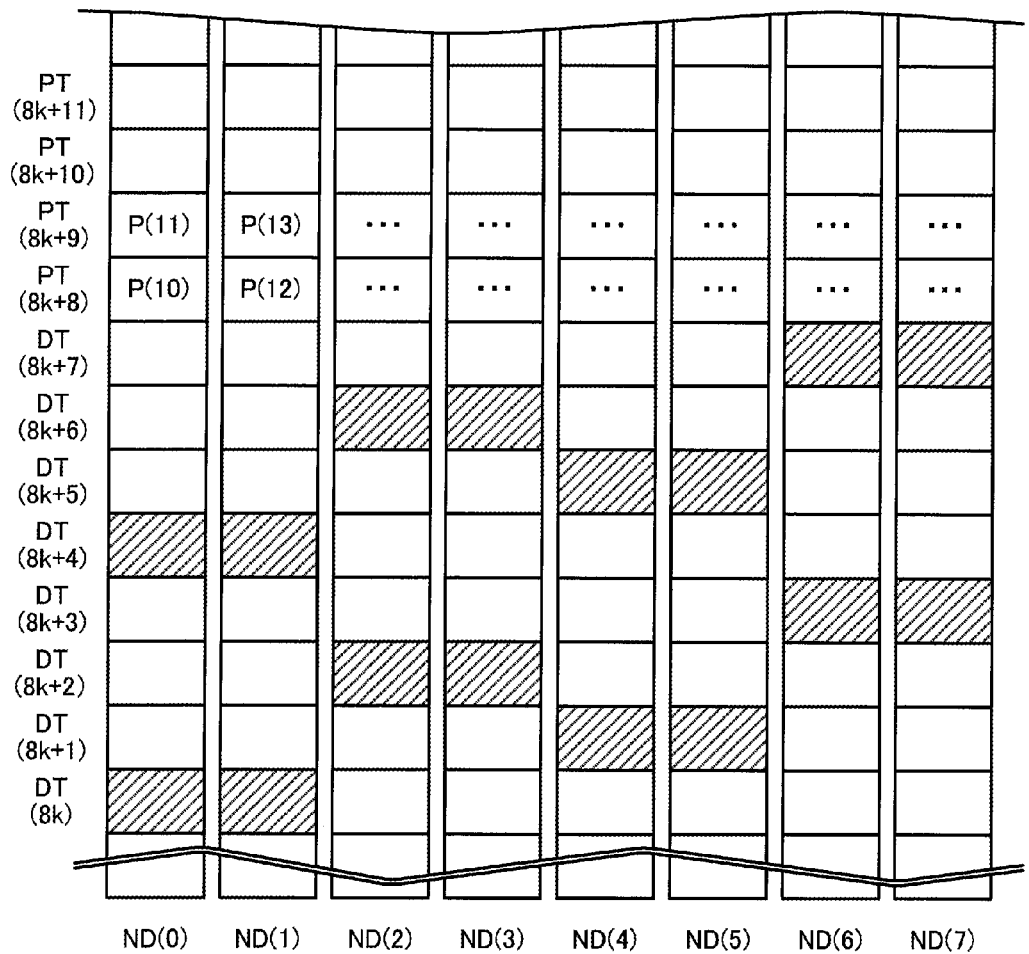
FIG. 12 illustrates an example of logical blocks (with parity) in replication at multiplicity 2 according to the second embodiment.

The storage nodes ND(0) through ND(7) in RAID shift state phase 1 are depicted in FIG. 12. FIG. 12 illustrates an example of logical blocks (with parity) in replication at multiplicity 2 according to the second embodiment.

In RAID shift state phase 1, the computing node 12 generates the next parities on the basis of the initial parities generated in RAID shift state phase 0. The computing node 12 generates the next parities in the same storage node 13 in which the initial parities are stored. That is, the computing node 12 generates the next parities within the storage node 13 in which the initial parities are stored. Therefore, in the storage system 10, data transfer between the plurality of storage nodes 13 is not performed when generating parities.

For example, a parity P(10) to be stored in the physical block PT(8k+8) of the storage node ND(0) may be generated from the parity P(0) having been stored in the physical block PT(8k+8) of the storage node ND(0) and the parity P(1) having been stored in the physical block PT(8k+9) of the storage node ND(0). A parity P(11) to be stored in the physical block PT(8k+9) of the storage node ND(0) may be generated from the parity P(2) having been stored in the physical block PT(8k+10) of the storage node ND(0) and the parity P(3) having been stored in the physical block PT(8k+11) of the storage node ND(0). Similarly, a parity P(12) to be stored in the physical block PT(8k+8) of the storage node ND(1) may be generated from the parity P(4) having been stored in the physical block PT(8k+8) of the storage node ND(1) and the parity P(5) having been stored in the physical block PT(8k+9) of the storage node ND(1). A parity P(13) to be stored in the physical block PT(8k+9) of the storage node ND(1) may be generated from the parity P(6) having been stored in the physical block PT(8k+10) of the storage node ND(1) and the parity P(7) having been stored in the physical block PT(8k+11) of the storage node ND(1).

Note that the computing node 12 clears the initial parities having been stored in the physical blocks PT(8k+10) and PT(8k+11) of the storage node ND(0) when the next parities are generated. The same applies to the physical blocks PT(8k+10) and PT(8k+11) of the storage node ND(1).

Parity generation in RAID shift state phase ph may be generalized as described below. Assuming that, in RAID shift state phase ph, all the parities obtained by formula (4) are stored in the same storage node 13, a set of parities A(ph, $k_{ph}$) may be divided into formulas (5) and (6).

$$A(\text{ph}, k_{ph}) = \alpha 2^{M-ph} + k_{ph} \ (0 \leq k_{ph} < 2^{M-ph}) \quad (4)$$

$$A_{even}(\text{ph}, k_{p+1}) = \alpha 2^{M-ph} + 2k_{ph+1} \ (0 \leq k_{ph+1} < 2^{M-ph-1}) \quad (5)$$

$$A_{odd}(\text{ph}, k_{p+1}) = \alpha 2^{M-ph} + 2k_{ph+1} + 1 \ (0 \leq k_{ph+1} < 2^{M-ph-1}) \quad (6)$$

Parities of A(ph+1, $k_{p+1}$) are the sum of parities of $A_{even}$(ph, $k_{p+1}$) and parities of $A_{odd}$(ph, $k_{p+1}$). That is, the computing node 12 may generate the parities of A(ph+1, $k_{p+1}$) within the storage node 13 in which parities of A(ph, $k_{ph}$) are held.

Further, the computing node 12 may generate parities of the next RAID shift state phase ph+1 from the parities stored in RAID shift state phase ph by using formula (7).

$$A(\text{ph}+1, k_{p+1}) = A_{even}(\text{ph}, k_{p+1}) \text{ div } 2 = \alpha 2^{M-(ph+1)} + k_{ph+1} \ (0 \leq k_{ph+1} < 2^{M-(ph+1)}) \quad (7)$$

Accordingly, the computing node 12 may generate parities in up to RAID shift state phase M−1, inductively from the initial parities held in a single storage node 13.

Further, in RAID shift state phase 1, the storage system 10 selects data regions that hold data elements, and clears data elements in the non-selected data regions. The hatched physical blocks in FIG. 12 indicate the selected data regions. For example, data regions at addresses whose last two digits are "00" are selected in the storage nodes ND(0) and ND(1), and data regions at addresses whose last two digits are "10" are selected in the storage nodes ND(2) and ND(3). Similarly, data regions at addresses whose last two digits are "01" are selected in the storage nodes ND(4) and ND(5), and data regions at addresses whose last two digits are "11" are selected in the storage nodes ND(6) and ND(7). Thus, the multiplicity of replication in the storage nodes ND(0) through ND(7) becomes 2.

Note that, due to the selection of data regions and clearing of data elements in the non-selected data regions, it becomes impossible to read data elements from some of the data regions that have been accessible. Therefore, the computing node 12 updates the formula for calculating the offset.

Figure 13:
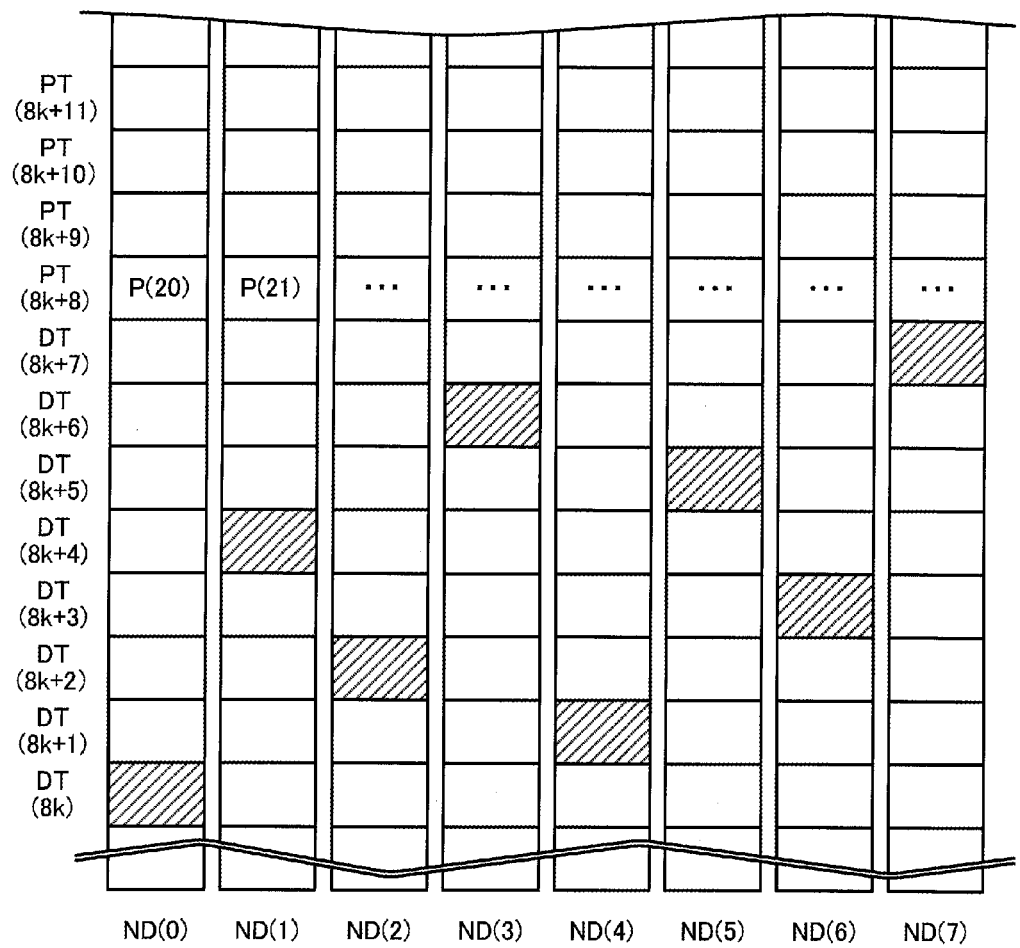
FIG. 13 illustrates an example of logical blocks shifted to RAID according to the second embodiment.

The storage nodes ND(0) through ND(7) in RAID shift state phase 2 are depicted in FIG. 13. FIG. 13 illustrates an example of logical blocks shifted to RAID according to the second embodiment.

In RAID shift state phase 2, the computing node 12 generates the next parity on the basis of the previous parities generated in RAID shift state phase 1. The computing node 12 generates the next parity in the same storage node 13 in which the previous parities are stored. That is, the computing node 12 generates the next parity within the storage node 13 in which the initial parities are stored. Therefore, in the storage system 10, data transfer between the plurality of storage nodes 13 is not performed when generating parities.

For example, a parity P(20) to be stored in the physical block PT(8k+8) of the storage node ND(0) may be generated from the parity P(10) having been stored in the physical block PT(8k+8) of the storage node ND(0) and the parity P(11) having been stored in the physical block PT(8k+9) of the storage node ND(0). Similarly, a parity P(21) to be stored in the physical block PT(8k+8) of the storage node ND(1) may be generated from the parity P(12) having been stored in the physical block PT(8k+8) of the storage node ND(1) and the parity P(13) having been stored in the physical block PT(8k+9) of the storage node ND(1).

Note that the computing node 12 clears the previous parity having been stored in the physical block PT(8k+9) of the storage node ND(0) when the next parity is generated. The same applies to the physical block PT(8k+9) of the storage node ND(1).

Further, in RAID shift state phase 2, the storage system 10 selects data regions that hold data elements, and clears data elements in the non-selected data regions. The hatched physical blocks in FIG. 13 indicate the selected data regions. For example, a data region at an addresses whose last three digits are "000" is selected in the storage node ND(0), and a data region at an address whose last three digits are "100" is selected in the storage node ND(1). Similarly, a data region at an addresses whose last three digits are "010" is selected in the storage node ND(2), and a data region at an address whose last three digits are "110" is selected in the storage node ND(3). A data region at an addresses whose last three digits are "001" is selected in the storage node ND(4), and a data region at an address whose last three digits are "101" is selected in the storage node ND(5). Similarly, a data region at an addresses whose last three digits are "011" is selected in the storage node ND(6), and a data region at an address whose last three digits are "111" is selected in the storage node ND(7). Thus, the multiplicity of replication in the storage nodes ND(0) through ND(7) becomes 1. That is, the storage nodes ND(0) through ND(7) are shifted from replication to RAID (for example, RAID 5).

In this way, the storage system 10 performs, a plurality of times, an operation of selecting half of data regions storing data elements from among the plurality of data regions, for each storage node 13. Thus, it is possible to reduce the multiplicity of the data elements.

Note that, due to the selection of data regions and clearing of data elements in the non-selected data regions, it becomes impossible to read data elements from some of the data regions that have been accessible. Therefore, the computing node 12 updates the formula for calculating the offset.

In this way, the storage system 10 is able to generate the parities, reduce the multiplicity of replication, and thus perform a shift to RAID, without transferring data between storage nodes 13. In performing a shift from replication to RAID, the storage system 10 does not perform data transfer between storage nodes. This makes it possible to reduce the effects on user operations. Further, the storage system 10 is able to provide the user with replication and RAID according to the course in which the access frequency to the newly generated data gradually decreases from a high level to a low level.

(c) Third Embodiment

Next, a storage system 10 of a third embodiment will be described. The storage system 10 of the third embodiment differs from the storage system 10 of the second embodiment in that compression of data regions is performed in the RAID shift state phase.

Figure 14:
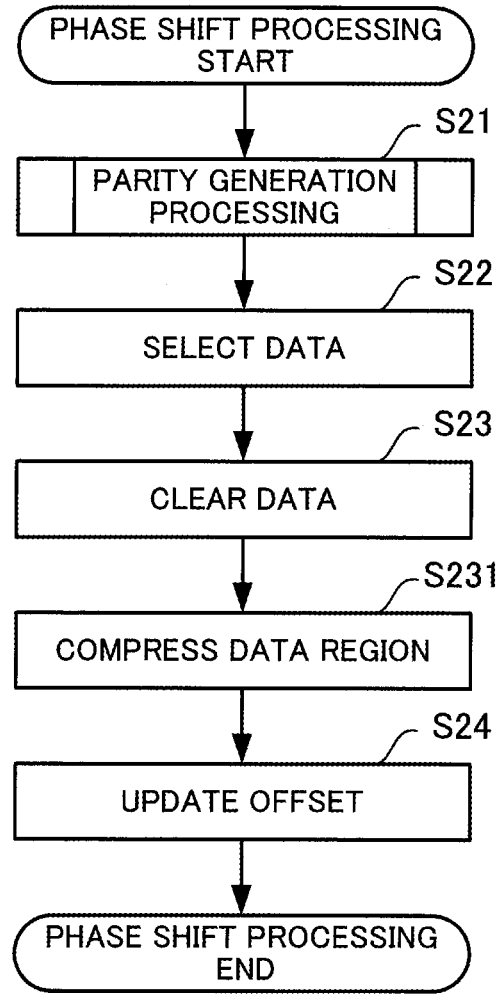
FIG. 14 is a flowchart illustrating phase shift processing according to a third embodiment.

First, phase shift processing of the third embodiment will be described with reference to FIG. 14. FIG. 14 is a flowchart illustrating phase shift processing according to the third embodiment.

The phase shift processing is processing for reducing the multiplicity of replication in a stepwise manner. In the phase shift processing of the third embodiment, after clearing data but before updating the offset, compression of data regions are performed.

In the following description of the phase shift processing of the third embodiment, steps corresponding to those of the phase shift processing of the second embodiment are denoted by the same step numbers, and will not be further described.

(Step S231) Step S231 is performed after step S23 but before step S24, by the computing node 12 (processor 101). That is, after step S23, the computing node 12 moves data elements such that the selected data regions are continuously arranged, and then compresses the data regions.

For example, address conversion associated with movement of data elements may be performed by a right shift operation (div 2) on the binary representation. In the case where the address of the data region is even, a converted address may be obtained by reducing the address to half. In the case where the address of the data region is odd, a converted address may be obtained by reducing the address by 1 and then reducing the address to half.

Accordingly, when the address of the physical block in the initial state is given by formula (8), then the converted address is given by formula (10) under the condition of formula (9).

$$A = \alpha 2^M + \sum_{i=0}^{M-1} d_a(i) 2^i \quad (8)$$

in which $\alpha$ is a variable representing the location of the logical block, and $d_a(i)$ is a value of the i-th last digit of the address A.

$$d_a(\mathrm{ph}) = d_n(M-\mathrm{ph}-1) \quad (9)$$

$$A = \alpha 2^{M-\mathrm{ph}-1} + \sum_{i=0}^{m-\mathrm{ph}-2} d_a(i+\mathrm{ph}+1) 2^i \quad (10)$$

For example, the physical block of $d_a(\mathrm{ph})=0$ is selected when $d_0(M-\mathrm{ph}-1)=0$, and the physical block of $d_a(\mathrm{ph})=1$ is selected when $d_0(M-\mathrm{ph}-1)=1$.

Accordingly, with regard to the physical block that is finally selected in the storage node ND(n), the remainder of dividing the address of the physical block by $2^M$ matches the integer obtained by inverting the bits in the binary representation of n.

Thus, there is only one logical block in each node which matches the result obtained by the operation of the address of the physical block div $2^M$. Further, as apparent from formula (10), when the RAID shift state phase reaches M−1, the physical blocks holding data elements in the respective nodes are converted into physical blocks at the same address in the respective nodes. Therefore, the storage system 10 is able to form an extent with the compressed physical blocks in RAID shift state phase M−1. Thus, the storage system 10 is able to form RAID by generating parities between compressed physical blocks.

Figure 15:
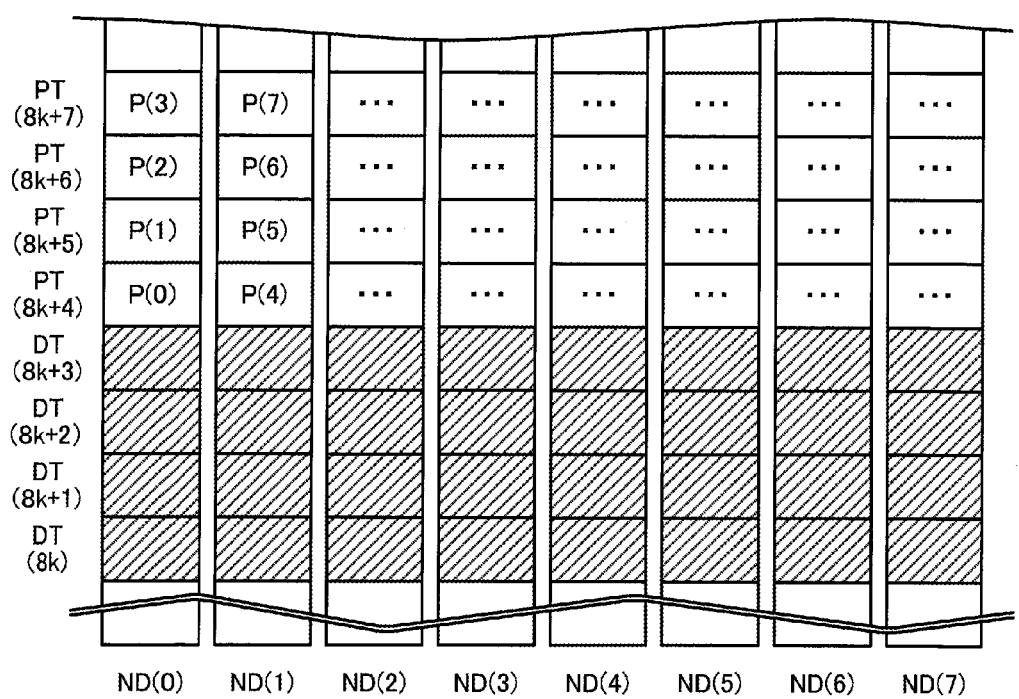
FIG. 15 illustrates an example of compressed logical blocks (with parity) in replication at multiplicity 4 according to the third embodiment.

Next, logical blocks in the process of shifting from replication to a RAID configuration according to the third embodiment will be described with reference to FIGS. 15 through 19. FIG. 15 illustrates an example of compressed logical blocks (with parity) in replication at multiplicity 4 according to the third embodiment.

Note that the logical blocks of FIG. 15 are obtained by compressing the logical blocks (with parity) in replication at multiplicity 4 of FIG. 11.

Reference numerals ND(0) through ND(7) denote storage nodes 13 that realize replication at multiplicity 4 for a predetermined number of logical blocks.

The storage nodes ND(0) through ND(7) are in RAID shift state phase 0. Each logical block has a total of 8 physical blocks, including 4 physical blocks DT(8k) through DT(8k+3) and 4 physical blocks PT(8k+4) through PT(8k+7).

Note that, due to the selection of data regions, the clearing of data elements in the non-selected data regions, and the compression of the data regions, it becomes impossible to read data elements from some of the data regions that have been accessible. Therefore, the computing node 12 updates the formula for calculating the offset.

Figure 16:
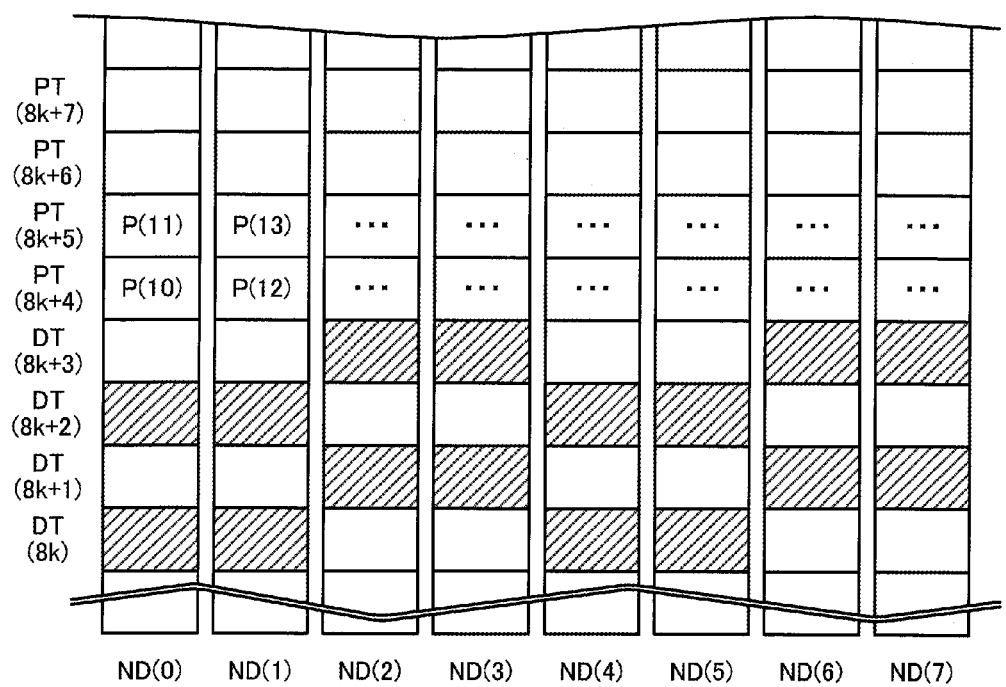
FIG. 16 illustrates an example of uncompressed logical blocks (with parity) in replication at multiplicity 2 according to the third embodiment.

The storage nodes ND(0) through ND(7) in RAID shift state phase 1 are depicted in FIG. 16. FIG. 16 illustrates an example of uncompressed logical blocks (with parity) in replication at multiplicity 2 according to the third embodiment.

In RAID shift state phase 1, the computing node 12 generates the next parities on the basis of the initial parities generated in RAID shift state phase 0. Generation of parities is performed in the same manner as in the second embodiment, and therefore will not be further described herein.

Further, in RAID shift state phase 1, the storage system 10 selects data regions that hold data elements, and clears data elements in the non-selected data regions. The hatched physical blocks in FIG. 16 indicate the selected data regions. For example, data regions at addresses whose last digit is "0" are selected in the storage nodes ND(0) and ND(1), and data regions at addresses whose last digit is "1" are selected in the storage nodes ND(2) and ND(3). Similarly, data regions at addresses whose last digit is "0" are selected in the storage nodes ND(4) and ND(5), and data regions at addresses whose last digit is "1" are selected in the storage nodes ND(6) and ND(7). Thus, the multiplicity of replication in the storage nodes ND(0) through ND(7) becomes 2.

Figure 17:
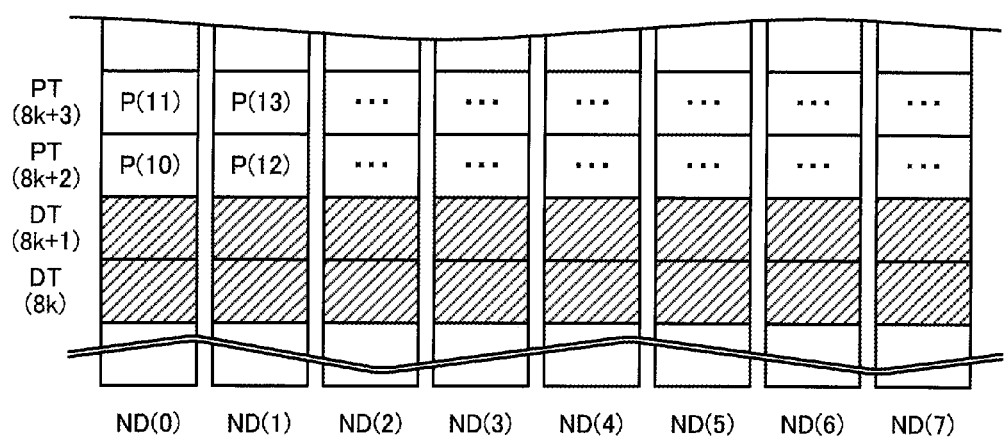
FIG. 17 illustrates an example of compressed logical blocks (with parity) in replication at multiplicity 2 according to the third embodiment.

The compressed storage nodes ND(0) through ND(7) in RAID shift state phase 1 are depicted in FIG. 17. FIG. 17 illustrates an example of compressed logical blocks (with parity) in replication at multiplicity 2 according to the third embodiment.

Each logical block has a total of four physical blocks, including two physical blocks DT(8*k*) and DT(8*k*+1) and two physical blocks PT(8*k*+2) and PT(8*k*+3).

Note that, due to the selection of data regions, the clearing of data elements in the non-selected data regions, and the compression of the data regions, it becomes impossible to read data elements from some of the data regions that have been accessible. Therefore, the computing node 12 updates the formula for calculating the offset.

Figure 18:
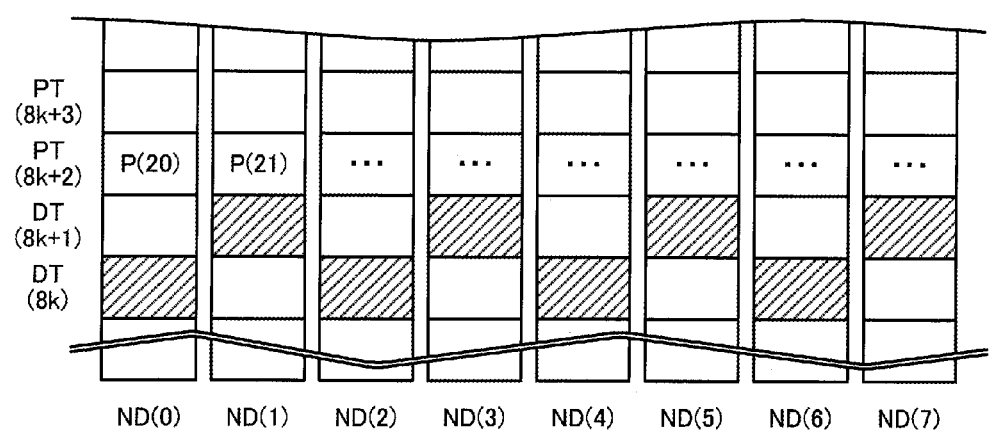
FIG. 18 illustrates an example of uncompressed logical blocks shifted to RAID according to the third embodiment.

The storage nodes ND(0) through ND(7) in RAID shift state phase 2 are depicted in FIG. 18. FIG. 18 illustrates an example of uncompressed logical blocks shifted to RAID according to the third embodiment.

In RAID shift state phase 2, the computing node generates the next parities on the basis of the previous parities generated in RAID shift state phase 1. Generation of parities is performed in the same manner as in the second embodiment, and therefore will not be further described herein.

Further, in RAID shift state phase 2, the storage system 10 selects data regions that hold data elements, and clears data elements in the non-selected data regions. The hatched physical blocks in FIG. 18 indicate the selected data regions. For example, data regions at addresses whose last digit is "0" are selected in the storage nodes ND(0), ND(2), ND(4), and ND(6). Data regions at addresses whose last digit is "1" are selected in the storage nodes ND(1), ND(3), ND(5), and ND(7). Thus, the multiplicity of replication in the storage nodes ND(0) through ND(7) becomes 1. That is, the storage nodes ND(0) through ND(7) are shifted from replication to RAID.

Figure 19:
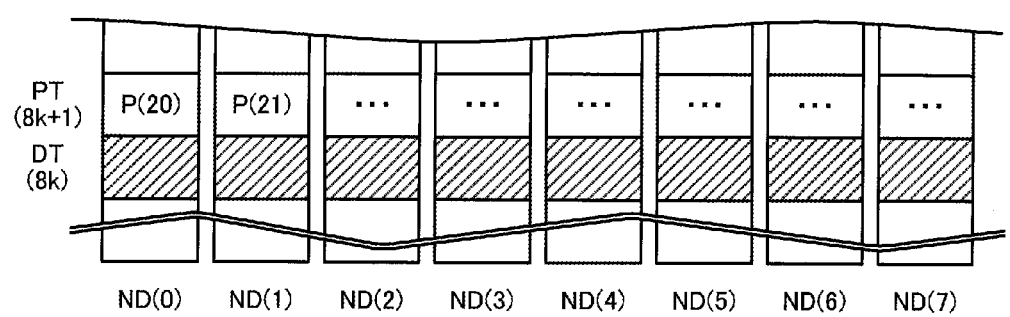
FIG. 19 illustrates an example of compressed logical blocks shifted to RAID according to the third embodiment.

The compressed data regions ND(0) through ND(7) in RAID shift state phase 2 are depicted in FIG. 19. FIG. 19 illustrates an example of compressed logical blocks shifted to RAID according to the third embodiment.

Each logical block has a total of two physical blocks, including one physical block DT(8*k*) and one physical block PT(8*k*+1). Thus, the storage system 10 is able to perform a shift from replication at multiplicity 8 for one logical block to RAID.

Note that, due to the selection of data regions, the clearing of data elements in the non-selected data regions, and the compression of the data regions, it becomes impossible to read data elements from some of the data regions that have been accessible. Therefore, the computing node 12 updates the formula for calculating the offset.

In this way, the storage system 10 is able to shift from replication to RAID while reducing the effects on user operations.

Although the above embodiments have been described with reference to the information processing apparatus 2 and the computing node 12, the embodiments are applicable to other information processing apparatuses, including the management node 11.

The above-described processing functions may be implemented by a computer. In this case, a program describing operations of the functions of the information processing apparatus 2, the computing node 12, and the management node 11 is provided. When the program is executed by a computer, the above-described processing functions are implemented on the computer. The programs describing operations of the functions may be stored in a computer-readable recording medium. Examples of computer-readable recording media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include DVD, DVD-RAM, CD-ROM, CD-RW, and the like. Examples of magneto-optical storage media include magneto-optical disk (MO) and the like.

For distribution of the program, portable storage media, such as DVD, CD-ROM, and the like, storing the program may be sold, for example. Further, the program may be stored in a storage device of a server computer so as to be transmitted from the server computer to other computers via a network.

A computer which is to execute the program stores, in its storage device, the program recorded on a portable storage medium or the program transmitted from a server computer. Then, the computer reads the program from its storage device, and performs processing in accordance with the program. The computer may read the program directly from the portable recording medium, and execute processing in accordance with the program. Further, the computer may sequentially receive the program from a server computer connected over a network, and perform processing in accordance with the received program.

The above-described processing functions may also be implemented wholly or partly by using electronic circuits such as DSP, ASIC, PLD, and the like.

According to an aspect, there are provided a storage system, an information processing apparatus, and a method of controlling an information processing apparatus that are capable of performing a shift from replication to RAID without transferring data between storage nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
    an information processing apparatus; and
    a plurality of storage nodes;
    wherein each of the storage nodes includes a plurality of data regions and a parity region corresponding to the plurality of data regions;
    wherein the information processing apparatus includes one or more processors configured to perform a procedure including:
        replicating a plurality of data elements respectively stored in the plurality of data regions of one of the plurality of storage nodes, and storing replicated data elements respectively in the plurality of data regions of each of other storage nodes,
        generating a parity corresponding to the data elements respectively stored in the plurality of data regions, and storing the parity in the parity region, for each of the storage nodes, and
        selecting, for each of the storage nodes, one or more data regions that hold data elements, from among the plurality of data regions, based on a calculation using a node number which identifies said each storage node and releasing one or more non-selected data regions so as to reduce a multiplicity of the data elements respectively stored in the plurality of data regions of each of the plurality of storage nodes;

wherein node numbers respectively identifying the plurality of storage nodes are in ascending order; and wherein the selecting includes selecting a digit from a bit string indicating the node number in order from a most significant digit of the bit string to a least significant digit of the bit string based on a count of the selecting of a digit and selecting the one or more data regions based on the calculation using a value of the digit selected.

2. The storage system according to claim 1, wherein:

the multiplicity of the data elements respectively stored in the plurality of data regions of each of the plurality of storage nodes is a power of 2; and the selecting includes performing, a plurality of times, an operation of selecting half of data regions storing data elements from among the plurality of data regions, for each of the storage nodes.

3. The storage system according to claim 2, wherein:

the procedure further includes determining whether to select the one or more data regions, based on a predetermined condition; and the selecting includes selecting the one or more data regions, based on a result of the determination whether to select the one or more data regions.

4. The storage system according to claim 3, wherein:

the number of the plurality of storage nodes is a power of 2; and the selecting includes selecting the one or more data regions, on the basis of identification information of the storage node.

5. The storage system according to claim 3, wherein the procedure further includes, after releasing the one or more non-selected data regions, relocating the data elements stored in the selected one or more data regions such that the data elements are continuously arranged, for each of the storage nodes.

6. The storage system according to claim 3, wherein the generating includes generating the parity on the basis of the selected data regions, each time the operation of selecting half of the data regions is performed.

7. The storage system according to claim 3, wherein the determining includes determining whether to select the one or more data regions, based on a comparison between an access frequency to the data elements respectively held in the plurality data regions and a preset threshold.

8. An information processing apparatus that is connected to a plurality of storage nodes, each including a plurality of data regions and a parity region corresponding to the plurality of data regions, the information processing apparatus comprising:

one or more processors configured to perform a procedure including:

replicating a plurality of data elements respectively stored in the plurality of data regions of one of the plurality of storage nodes, and storing replicated data elements respectively in the plurality of data regions of each of the other storage nodes, generating a parity corresponding to the data elements respectively stored in the plurality of data regions, and storing the parity in the parity region, for each of the storage nodes, and selecting, for each of the storage nodes, one or more data regions that hold data elements, from among the plurality of data regions, based on a calculation using a node number which identifies said each storage node and releasing one or more non-selected data regions so as to reduce a multiplicity of the data elements respectively stored in the plurality of data regions of each of the plurality of storage nodes, wherein node numbers respectively identifying the plurality of storage nodes are in ascending order; and wherein the selecting includes selecting a digit from a bit string indicating the node number in order from a most significant digit of the bit string to a least significant digit of the bit string based on a count of the selecting of a digit and selecting the one or more data regions based on the calculation using a value of the digit selected.

9. A non-transitory computer-readable storage medium storing a program that causes an information processing apparatus, which is connected to a plurality of storage nodes, each including a plurality of data regions and a parity region corresponding to the plurality of data regions, to perform a procedure comprising:

replicating a plurality of data elements respectively stored in the plurality of data regions of one of the plurality of storage nodes, and storing replicated data elements respectively in the plurality of data regions of each of the other storage nodes;

generating a parity corresponding to the data elements respectively stored in the plurality of data regions, and storing the parity in the parity region, for each of the storage nodes; and selecting, for each of the storage nodes, one or more data regions that hold data elements, from among the plurality of data regions, based on a calculation using a node number which identifies said each storage node and releasing one or more non-selected data regions so as to reduce a multiplicity of the data elements respectively stored in the plurality of data regions of each of the plurality of storage nodes, wherein node numbers respectively identifying the plurality of storage nodes are in ascending order; and wherein the selecting includes selecting a digit from a bit string indicating the node number in order from a most significant digit of the bit string to a least significant digit of the bit string based on a count of the selecting of a digit and selecting the one or more data regions based on the calculation using a value of the digit selected.

\* \* \* \* \*